Aug. 17, 1965                S. T. TRANSEAU                3,201,007
                          ROTARY FEEDER MECHANISM
Filed Nov. 13, 1962                                    7 Sheets-Sheet 1

INVENTOR.
SHERMAN T. TRANSEAU
BY Leo Edelson
ATTORNEY

Aug. 17, 1965

S. T. TRANSEAU 3,201,007

ROTARY FEEDER MECHANISM

Filed Nov. 13, 1962

INVENTOR.
SHERMAN T. TRANSEAU
BY
*Leo Edelson*
ATTORNEY

Aug. 17, 1965  S. T. TRANSEAU  3,201,007
ROTARY FEEDER MECHANISM
Filed Nov. 13, 1962  7 Sheets-Sheet 3

INVENTOR
SHERMAN T. TRANSEAU
BY Leo Edelson
ATTORNEY

Aug. 17, 1965  S. T. TRANSEAU  3,201,007
ROTARY FEEDER MECHANISM
Filed Nov. 13, 1962  7 Sheets-Sheet 4

INVENTOR.
SHERMAN T. TRANSEAU
BY Leon Edelson
ATTORNEY

Aug. 17, 1965  S. T. TRANSEAU  3,201,007
ROTARY FEEDER MECHANISM

Filed Nov. 13, 1962  7 Sheets-Sheet 7

INVENTOR.
SHERMAN T. TRANSEAU
BY
*Lew Edelson*
ATTORNEY

# United States Patent Office 3,201,007
Patented Aug. 17, 1965

3,201,007
ROTARY FEEDER MECHANISM
Sherman T. Transeau, R.D., Riverside, N.J.
Filed Nov. 13, 1962, Ser. No. 237,123
14 Claims. (Cl. 222—345)

This invention relates generally to rotary feeder mechanisms of the type wherein a circumferentially pocketed rotor part is revolubly journalled in a surrounding housing or stator part having inlet and outlet openings at opposite sides of the rotor which are successively traversed by the several rotor pockets to transfer material delivered into the inlet opening of the feeder to the outlet opening thereof, and more particularly relates to improvements in the construction of such a rotary feeder mechanism for improving the operation thereof.

In the past it has been a serious problem to insure adequate sealing between the rotor blades and the inner wall of the stator in those applications where the feeder mechanism is employed in a system requiring the maintenance of a pressure differential between the inlet and outlet parts of the mechanism that is, across the rotor part itself. It has been found that when attempts were made to machine the rotor and stator for close rotating fit of the rotor blades within the stator, even a slight eccentricity of the rotor relative to the stator resulted in jamming of the rotor during operation of the mechanism. Moreover experience with the problem has shown that certain kinds of material, such as plastic or gummy materials, cause jamming of the rotor within the stator even though these parts of the feeder mechanism are perfectly concentric. This jamming resulted from the fact that as the rotor blades successively move across the opening at the bottom of the stator intake throat they necessarily pass through a mass of material disposed partially in the throat and partially in the rotor pocket in immediate communication therewith, and in so doing the outer edges of the rotor blade sweep some of the material beyond the inlet opening where it becomes wedged between the rotor blades and the internal wall surface of the stator. This wedging action places a heavy load on the driving mechanism of the rotary feeder which may eventually halt the same or cause mechanical breakdown. Additionally, the presence of the inlet and outlet openings of the stator normally tend to create a wear condition at the rotor blade edges which in time causes jamming of the rotor within the stator. These foregoing mentioned problems have been greatly ameliorated but not completely solved by rotary feeder mechanisms of the type illustrated in my United States Patent 3,052,383, entitled Rotary Feeder Mechanism, and issued September 4, 1962.

The present invention incorporates, among other things, an improved inlet throat construction and outlet construction which provide for a more unrestricted and uniform flow of material through the rotary feeder device, and additionally provide a rotary feeder structure wherein each pocket of the rotor is sealed off from every other rotor pocket to thereby more effectively prevent any leakage from the inlet throat to the outlet throat of the feeder device around the periphery of the rotor, and provide a much more effective seal between the closed conduit system within which the rotary feeder mechanism is connected and the ambient atmosphere by means of a novel sealing mechanism. This novel sealing mechanism according to the invention differs from sealing mechanisms of the prior art which have been designed for the same general purpose in that whereas the latter were usually static devices fixedly positioned relative to the stator, the sealing mechanism according to the instant invention for preventing axial flow communication between the rotor and the end spaces of the feeder device are carried by and rotate with the rotor device itself. Moreover, these peripheral seals cooperate with the rotor blades tip assemblies to conjointly provide the means which completely seal each individual rotor pocket. The invention also contemplates the provision of novel end closure members for the feeder mechanism stator which also carry the bearings within which the rotor shaft is journalled, the end members forming with the rotor and stator a pair of end chambers and including means for pressurizing these end chambers to aid in confining conduited material to the conduit system, or to flush the end spaces with a cleaner or a coolant. With the foregoing in mind, it will now be appreciated that a primary object of this invention is to provide a novel rotary feeder device including a novel sealing gasket structure secured to and rotatable with the rotor part of the feeder mechanism to provide a substantially gas tight seal between the interior of the conduit system within which the feeder mechanism is secured and the ambient atmosphere.

Another object of this invention is to provide a novel rotary feeder mechanism as aforesaid wherein the perimetral outer edge of each rotor pocket is completely sealed by the conjoint action of the rotor blade tip structure and the aforesaid sealing gasket which isolate the interior of the conduit system from the ambient atmosphere.

Still another object of this invention is to provide a novel rotary feeder mechanism of the type described in which a pair of end spaces are provided at axially opposite ends of the rotor part and are provided with means by which the end spaces may be pressurized or flushed with a cleaning or cooling medium.

A further object of the invention is to provide a rotary feeder mechanism having an improved inlet and outlet throat construction effective to achieve a more uniform flow of material into and out of the feeder mechanism.

Yet another object of this invention is to provide a novel rotary feeder mechanism of the type aforedescribed including rotor blade tip assemblies of novel construction which effect improved interpocket sealing.

The foregoing and other objects of the invention will become clear from a reading of the following specification in conjunction with an examination of the appended drawings, wherein.

In the several figures, like elements are denoted by like reference characters.

Referring now to the drawings, and firstly to FIGURES 1 to 4, there will be seen a rotary feeder mechanism comprising generally a hollow cylindrical body member or main housing 30, a pair of end closure members 31, a rotor 32 fitted within the housing 30 between the end members 31, and a shaft 34 which passes axially through the rotor 32 and by means of which the latter is rotated. Extending upwardly and downwardly respectively from the hollow cylindrical portion of the main housing 30 are inlet throat 35 and a discharge outlet 36 each of which terminates in an annular bolting flange 37 by means of which the rotary feeder mechanism may be coupled into a bulk material conduit (not shown).

The end members 31 are bolted to the main housing 30 as by means of the bolts 38, and a pair of annular sealing assemblies 40 are disposed circumferentially about and carried by opposite ends of the rotor 32 to provide a peripheral seal between the rotor surface and the main housing 30 effective to prevent the conduited material passing through the feeder from being excreted laterally outwardly over the surface of the rotor 32 toward the end members 31. The shaft 34, to which is secured the rotor 32, is surrounded where it passes through the end members 31 by the gland assemblies 42 and is journalled at opposite ends in bearings 33 supported by a portion 39 of the end members 31.

Figure 3:
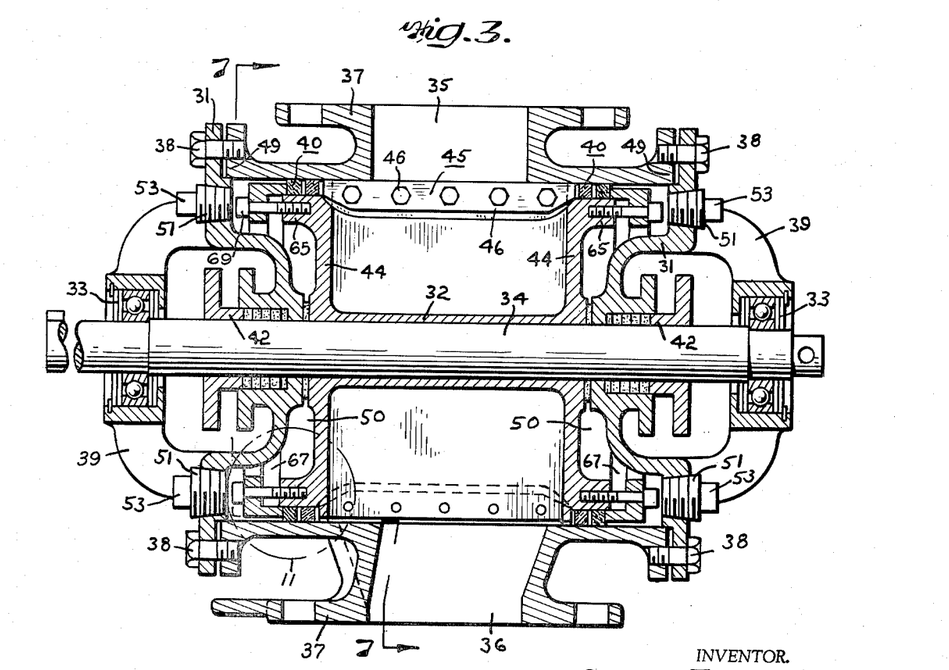
FIGURE 3 is an enlarged longitudinal sectional view taken through the rotary feeder illustrated in plan in FIGURE 1, and is taken along the line 3—3 as seen in that figure.
Figure 4:
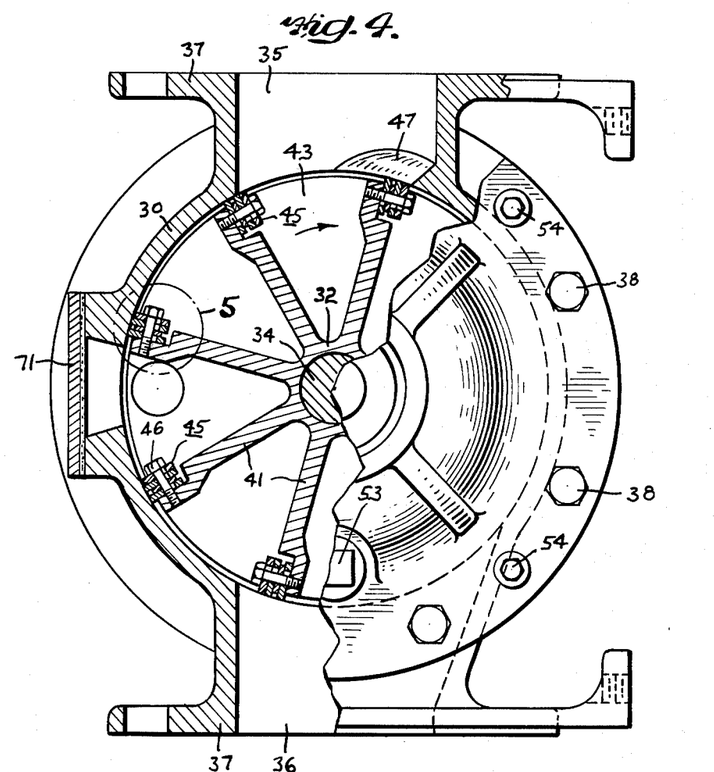
FIGURE 4 is an enlarged cross-sectional view through the rotary feeder mechanism of FIGURE 1 as would be seen when viewed along the line 4—4 of that figure, some parts being shown in section and other parts in elevation.

The rotor 32 is formed by the rotor end walls 44 and the radially projecting bladelike partitions 41 into a plurality of pockets 43 spaced uniformly about the rotor periphery, each of the pockets 43 being generally of V-shape in cross-section with its open end presenting outwardly of the rotor axis. The width of each of the pockets 43, which corresponds to the distance between the opposite end walls 44 of the rotor is seen to be somewhat greater than the diameters of the axially aligned inlet throat 35 and discharge outlet 36, so that the ends of the rotor partitions 41 always lie beyond the edges of the inlet and outlet. Secured to the outer end of each of the rotor blades 41 is a rotor blade tip assembly designated generally as 45 and fixedly secured to the rotor blade by the bolts 46.

As has been previously described in my aforementioned United States Patent No. 3,052,383, when conduited material is passed through the rotary feeder, some of the material will take up physical positions lying partly within a rotor pocket 43 and partly within the inlet throat 35, thereby creating the possibility of jamming the feeder mechanism by becoming wedged between the contiguous edges of the rotor blade tip assemblies 45 and the inside cylindrical surface of the main housing 30. In the rotary feeder according to the present invention, just as in the aforesaid patented construction, the problem is overcome by providing a shearing element 47 within the inlet throat to co-act with the leading edge of the rotor blade tip assembly 45, the shear 47 being best illustrated in the showings of FIGURES 1, 4 and 6.

Figure 1:
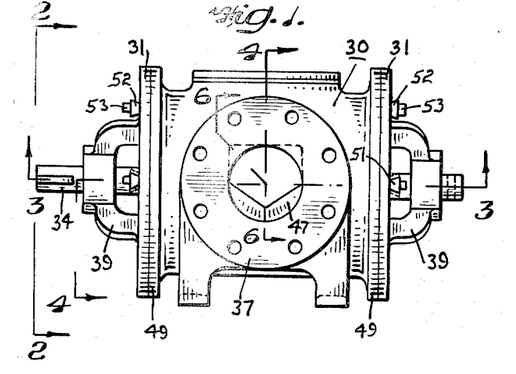
FIGURE 1 is a plan view of the rotary feeder mechanism according to the invention.
Figure 6:
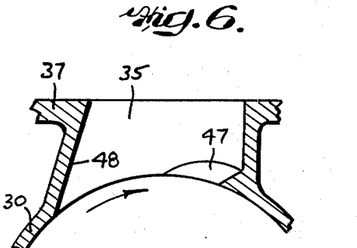
FIGURE 6 is an enlarged fragmentary view of the inlet throat structure of the feeder mechanism as would be seen when viewed along the line 6—6 of FIGURE 1.

The shear element 47 is contoured to lie exactly in the curved plane of the cylindrical inner surface of the main housing 30 so that it acts as an extension thereof and presents no discontinuities to the rotor blade tip assembly, the contoured shape of the shear element being most clearly seen in the showing of FIGURES 4 and 6. However, as best seen in FIGURES 1 and 6, the shape of the inlet throat 35 is modified from that disclosed in the aforementioned patent in that it does not constitute a completely vetrical bore. Instead, the side of the inlet throat 35 which is opposite the shear 47 is sloped away from the shear element in undercut fashion relative to the upper bolting flange 37, as shown at 48 in FIGURE 6, to maintain the cross-sectional area of the throat substantially constant and avoid what would be an effective throat restriction due to the presence of the shear element 47 fitted therein.

As best seen in FIGURE 3 the rotary feeder end closure members 31 are so formed as to closely interfit with the outer ends 49 of the main housing 30 when drawn up by bolts 38 and to thereby define between the end closure members 31 and the rotor end walls 44 a pair of annular end spaces 50. Each of the end closure members 31 is provided with a plurality of threaded fittings 51 and 52 providing for external communication with the annular end spaces 50, and each of the threaded fittings is closed by a plug member 53. Pressurization of the annular end spaces 50 is readily carried out when desired by merely removing one of the plugs 53 and connecting a pressurizing line to the fitting so that gas under pressure may be injected. Alternatively, if it is desired to flush the annular end spaces 50 with either a cleaning or heat-transfer medium, this may be effected by removing the plugs 53 from the upper and lower fittings 51 and connecting thereto a pair of conduit lines through one of which the desired medium may be injected and through the other of which it may be withdrawn to provide continuous circulation through the annular end spaces 50.

Figure 2:
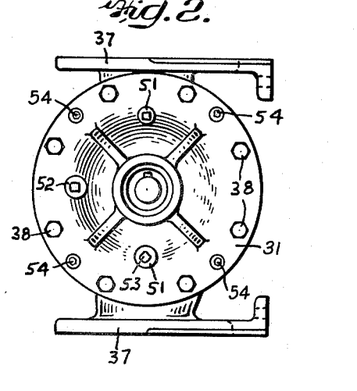
FIGURE 2 is an end view of the rotary feeder mechanism of FIGURE 1 as would be seen when viewed along the line 2—2 thereof.

As will be most clearly understood from the showing of FIGURE 3, the end members securing bolts 38 are projectable freely through the end member 31 and are threadedly engaged with the outer flanges 49 of the main housing 30. Referring now to FIGURE 2 there will be seen the heads of four jack bolts 54 positioned radially outward of the portions 39 of the end member 31. These jack bolts 54 are threadedly engaged with and projected through the end closure members 31 with their inner ends in abutment against the outer surface of the main housing flanges 49. Because of the close fit between the end closure members 31 and the cylindrical main housing 30, the closure members 31 are not readily removable even after the securing bolts 38 have been completely removed. Removal of the end closure members 31 is effected by rotation of the jack bolts 54 which cause the end members 31 to be screw advanced outward along the shank of the jack bolts and out of engagement with the main housing. For purposes of assembly, when the end closure members 31 have been properly positioned relative to the main housing 30, the jack bolts 54 may be inserted into bolting hole positions normally occupied by several of the bolts 38 and then tightened up to draw the end closure members 31 into proper seated engagement with the end flanges 49 of the main housing 30. When the end closure members 31 have been so seated, the jack bolts 54 may be removed and replaced by the bolts 38, these latter then being drawn up tight. The jack bolts 54 are then replaced in their normal positions as seen in FIGURE 2 until thereafter required for end member removal.

Figure 5:
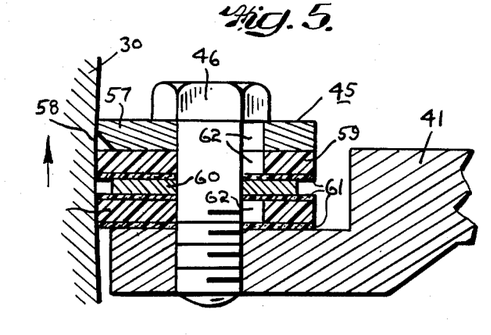
FIGURE 5 is an enlarged fragmentary view of one form of rotor pocket edge shown within the phantom circle of FIGURE 4 and illustrating one form of rotor blade tip structure.
Figure 9:
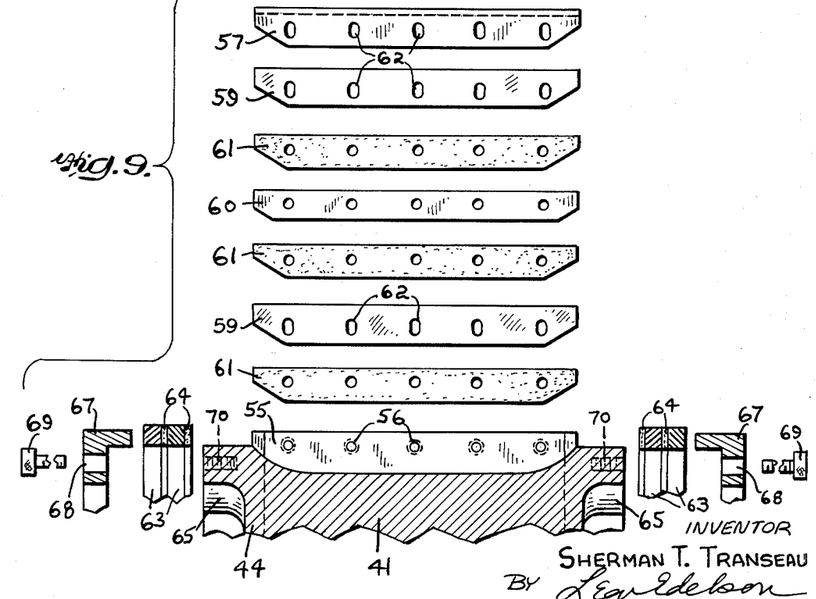
FIGURE 9 is an exploded view of the rotor blade and tip assembly, and rotor end sealing structure as would be seen in exploded view along the line 9—9 of FIGURE 7.

Turning now to a consideration of FIGURES 5 and 9 which illustrate most clearly the details of the rotor blade tip assembly 45. The rotor blades 41 are each faced off at their outer ends, as at 55, and provided with a plurality of bolt holes 56 which threadedly receive the bolts 46 that secure the tip assembly elements together. The tip assembly 45 consists of the steel tip 57 chamfered on its trailing edge as at 58, two Teflon or nylon sealing tips 59, a steel spacer member 60 and the three Teflon or nylon tape pieces 61, all of which are assembled in the sandwich arrangement as seen in FIGURE 5. The steel tip 57 and Teflon or nylon sealing tips 59 are provided with elongated apertures 62 through which the securing bolts 46 are projected so that these elements may be shifted radially outward toward the inside surface of the main housing 30 as they wear in use. The spacer 60 and tapes 61 are not provided with elongated holes such as 62 because they are not intended to be shifted radially at all. The steel tips 57 coact with the shear 47 in the inlet throat to maintain a free running condition of the rotor but can not provide the tight sealing function which is successfully carried out by the somewhat resilient sealing tips 59. As best seen in FIGURES 4 and 5, it is apparent that each of the rotor pockets 43 is provided with a tight seal between the rotor blades 41 and the inside of the hollow cylindrical main housing 30 by means of the rotor blade tip assembly 45. The rotor pocket end walls 44 are also sealed to the inside of the main housing 30 by means of the peripheral sealing ring assemblies 40 which cooperate with the rotor blade tip assemblies 45 in the manner most clearly seen in FIGURES 3, 9, 10 and 11 to which reference should now be made.

Figures 11, 12, 13:
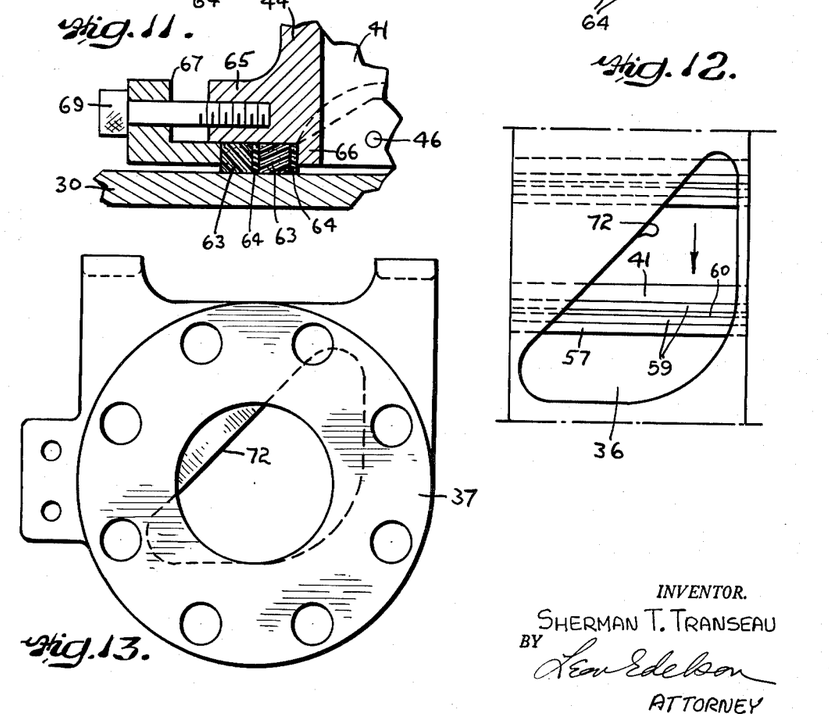
FIGURE 11 is an enlarged fragmentary view of a portion of the rotor to stator sealing gasket structure carried by the rotor, located as illustrated within the phantom circle of FIGURE 3.
FIGURE 12 is a fragmentary bottom plan view looking upward into the rotor pocket from the discharge throat as would be seen when viewed along the line 12—12 of FIGURE 7.
FIGURE 13 is a bottom plan view looking into the discharge outlet of the rotary feeder from below the outlet flange thereof.
Figures 14, 15:
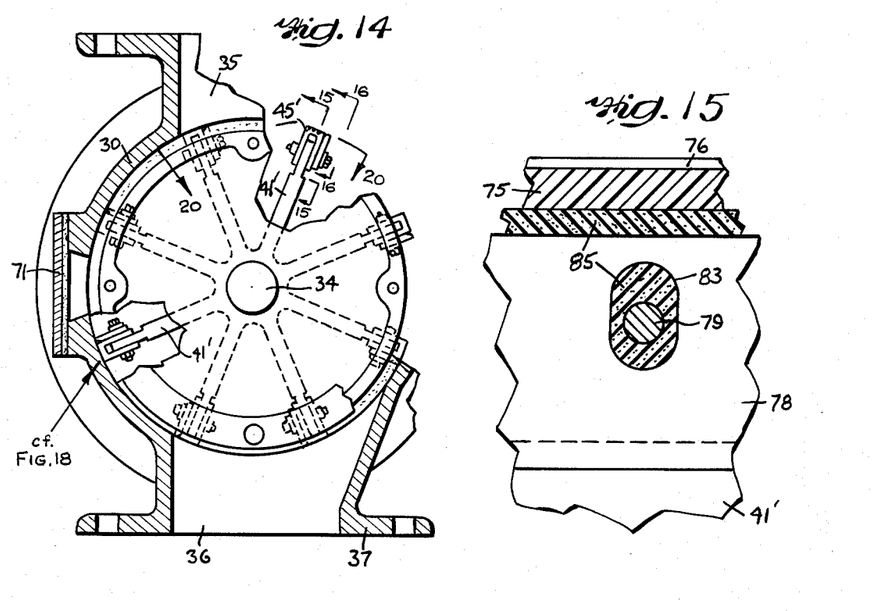
FIGURE 14 is similar to FIGURE 7 and differs therefrom only in the rotor blade tip assembly structure.
FIGURE 15 is an enlarged fragmentary view taken through the modified rotor tip assembly of FIGURE 14 as would be seen when viewed along the line 15—15 thereof.

Each of the sealing ring assemblies 40 includes a plurality of sealing rings 63, preferably of braided or twisted material, such as Teflon, and a plurality of substantially flat, thin annular disc or ring members 64 of suitable barrier material, such as rubber, neoprene, nylon, Orlon or Dacron, the rings 63 and 64 being alternated with one another and disposed peripherally about the rotor 32 in overlying relationship to the flanges 65 which extend axially of the rotor end walls 44. The flanges 65 are of smaller diameter than the rotor end walls 44 to thereby provide a shoulder 66 against which the inner ring 64 abuts. The sealing rings 63 and 64 are compressed against the shoulder 66, and thus caused to expand diametrically into sealing engagement with the inner surface of the main housing 30 by means of a compression ring 67 of L-shape in cross-section. The compression ring 67 is apertured peripherally as at 68 to permit the passage therethrough of bolts 69 which are threadedly engaged with threaded bores 70 extending axially into the rotor flanges 65 at points spaced about the periphery thereof. The radial position of the bolts 69 is in alignment with the plugs 53 threaded into the fittings of the end closure members 31 so that these bolts are accessible for tightening through the end closure members 31 by removing one of the plugs 53. The bolts 69 require tightening at intervals in order to maintain a good seal by compression of the sealing rings 63 and 64.

Figure 10:
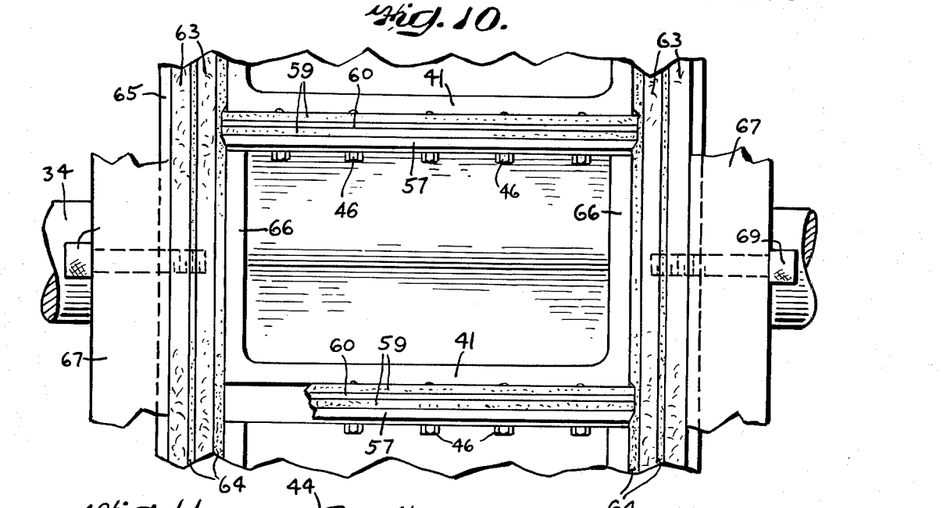
FIGURE 10 is a plan view looking into the pockets of the rotor structure as would be seen when viewed along the line 10—10 of FIGURE 7.

As most clearly appears in FIGURE 10, the annular shoulder 66 at each opposite end of the rotor 32, is interrupted at circumferentially spaced intervals to provide notched out portions which are respectively in registry with the rotor blade tip assemblies 45. Upon clamping the peripheral sealing ring assemblies 40 against the annular shoulders 66 of the rotor by means of the compression rings 67, the portions of said sealing ring assemblies which extend across the interrupted or notched-out regions of the shoulders 66 are expanded into sealing engagement with the oppositely projecting ends of the rotor blade tip assemblies 45. Thus, the rotor blade tip assemblies 45 which extend between the opposite side walls of the rotor along the outer edge of each vane thereof sealingly engage the peripheral sealing ring assemblies 40 carried by the opposite ends of the rotor, in consequence of which the said rotor blade tip assemblies and the peripheral sealing ring assemblies conjointly provide an uninterrupted seal between the stator and each rotor pocket which extends marginally about the full perimetral extent of the open end of each rotor pocket.

It will be noted that the peripheral seal assemblies 40 which, in the construction as illustrated in FIGURE 11 include the stacked compressible rings 63–64, are carried by and rotate with the rotor 32 as fixed parts thereof. The oppositely projecting extremities of the rotor blade tip assemblies 45 which are respectively engaged by the innermost compressible annuli of the peripheral seals serve, in conjunction with the clamping rings 67, to anchor said peripheral seals against all possibility of their moving relatively to the rotor. By so effectively locking the peripheral seals against rotation relatively to the rotor, slippage of the annuli 63–64 upon the rotor is effectively prevented, in consequence of which there is no possbility of wear in the rotor-engaging portions of the peripheral seals nor of leakage between said seals and the rotor such as might occur upon slippage of the sealing rings on the rotor.

Figure 7:
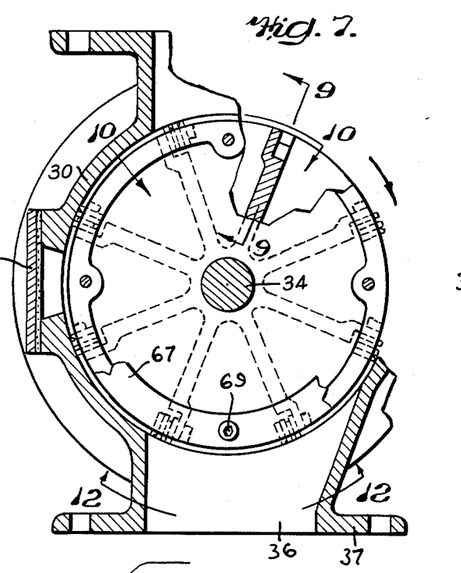
FIGURE 7 is a vertical jump section taken through the structure of FIGURE 3 as would be seen when viewed along the line 7—7 thereof; some parts being shown in section and others in elevation and fragmentation.
Figure 8:
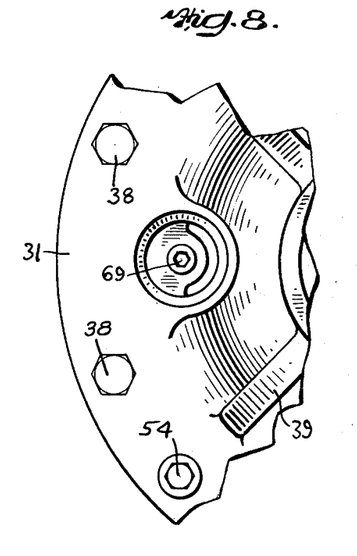
FIGURE 8 is an enlarged fragment of a portion of one end section of the feeder mechanism illustrating the end-securing and jacking bolts, and that one of the fittings, with plug removed, through which access is had to the sealing ring adjusting bolts and which also provides connection to the axial end chambers of the feeder mechanism.

For purposes of maintenance, and as best seen in the showing of FIGURES 4 and 7, an access door 71 is provided through the side wall of the main housing 30 so that the rotor blade tip assemblies 45 may be periodically checked and either replaced or radially adjusted by loosening and thereafter retightening the bolts 46 as may be necessary. The access door 71 extends substantially the full width of the housing 30 and may be secured in position by any convenient means.

FIGURES 12 and 13 show that the discharge outlet at 36 of the rotary feeder mechanism is not of constant cross-sectional area but is provided with a contoured opening 72 which results in a discharge characteristic which is more nearly uniform with respect to time. This results from the fact that the completely filled rotor pocket first encounters only a small area opening through which it can discharge, which opening gradually increases in size as the rotor pocket empties, and being of a length longer than a rotor pocket opening so that as discharge from a substantially exhausted pocket begins to decrease, the flow is maintained by exposure of the next successive loaded rotor pocket.

Turn now to an examination of FIGURES 14 through 21 which illustrate a rotary feeder mechanism of the type previously described in connection with FIGURES 1 through 13, but which differ therefrom in that the rotor blade tip assembly 45' illustrated therein is of a different structural configuration than that shown and described in connection with the rotor blade tip assembly 45 illustrated in the preceding figures. Examining first FIGURES 15, 17, 20 and 21, it is observed that the modified rotor blade tip assembly 45′ includes a steel tip element 73 chamfered at its rear face as at 74, and a generally U-shaped cross-section plastic sealing element 75 provided with longitudinally extending flutes or channels 76 on the outer surface of the bottom of the U. The spacing between the inside faces of the arms 77 of the U-shaped sealing element 75 is equal to the thickness of the reduced end section 78 of rotor blade 41′ so that the sealing element 75 may be slipped over the end section 78 and secured in position by means of the bolts 79, washers 80 and nuts 81 projected through apertures 82, 83 and 84 of steel tip 73, rotor blade end section 78 and sealing element 75 respectively. The apertures 83 in the rotor blade end section 78 are elongated to permit radial shifting of the sealing element 75 relative thereto, and the apertures 82 of the steel tip 73 are also elongated to permit relative radial shifting of the steel tip 73 relative to the sealing element 75 since in use the rate of wear at the stator engaging surfaces will be different and will require relative adjustment therebetween. The interpocket seal is maintained by virtue of the fact that a resilient material 85 as for example rubber or neoprene fills the void spaces of the apertures 82 and 83 and the channel portion of the U-shaped sealing element 75.

Figure 16:
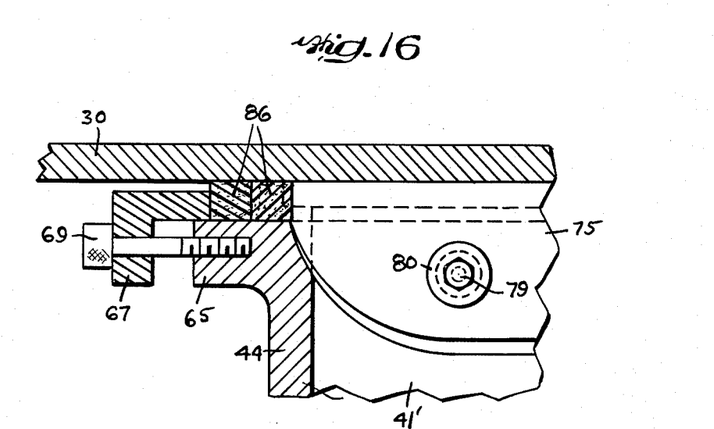
FIGURE 16 is an enlarged fragmentary view of the rotor tip assembly and rotor-to-stator sealing structure as would be seen when viewed along the line 16—16 of FIGURE 14.
Figure 17:
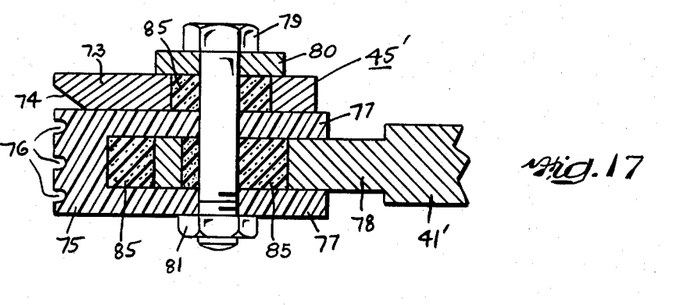
FIGURE 17 illustrates in enlarged fragmentary cross-sectional view the modified rotor blade tip structure of FIGURE 14.
Figure 18:
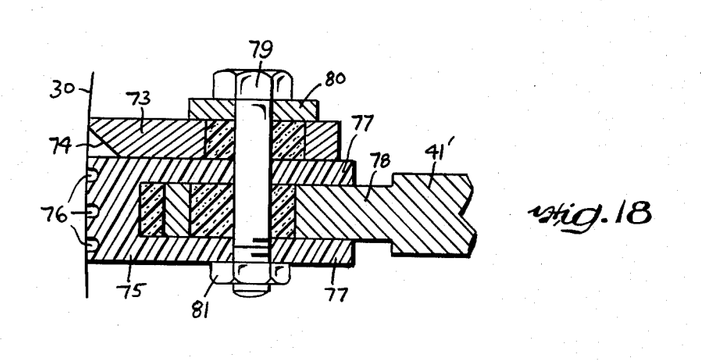
FIGURE 18 is similar to FIGURE 17 and illustrates the radially inwardly shifted position of the rotor tip assembly relative to the rotor blade when the rotor is installed within the stator of the feeder mechanism.
Figure 19:
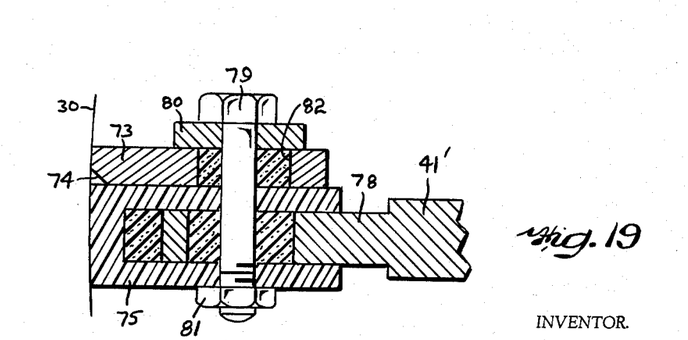
FIGURE 19 illustrates the rotor tip assembly of FIGURE 18 after a certain amount of wear has occurred.
Figure 20:
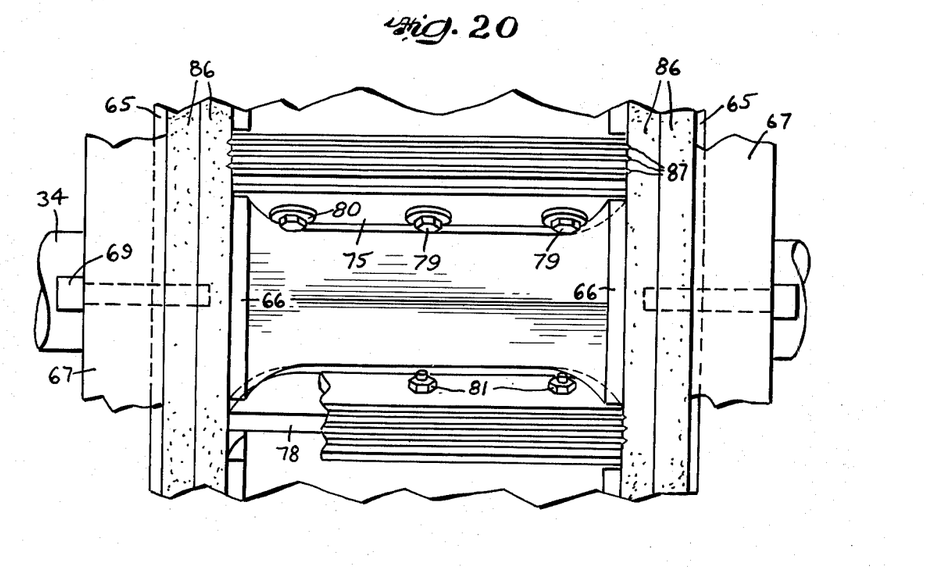
FIGURE 20 is similar to the showing of FIGURE 10 but illustrates the modified form of rotor tip assembly.
Figure 21:
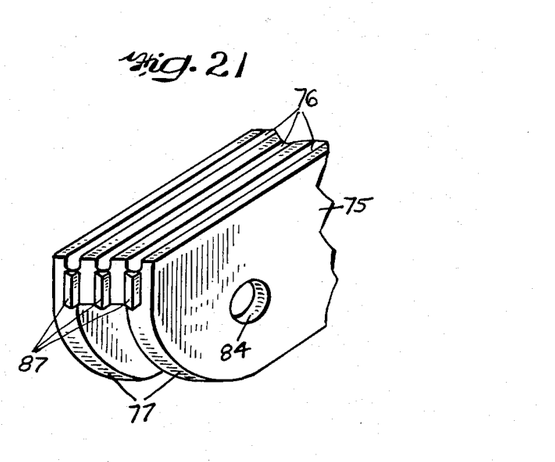
FIGURE 21 is an enlarged fragmentary perspective view of the rotor pocket sealing element of the rotor blade tip assembly most clearly seen in FIGURES 17 to 20.

FIGURE 17 shows the rotor blade tip assembly 45′ in the position which it naturally assumes due to the resilience of the resilient material 85 when the bolt 79 and nut 81 are loosened. When the rotor assembly is installed within the stator or housing 30 it is observed that the rotor blade tip assembly 45′ must be displaced radially inward so that there is a resilient force tending to bias the tip assembly radially outward against the inside cylindrical surface of the main housing 30. With the rotor blade tip assembly 45′ so displaced, the bolts 79 are tightened to fixedly secure the tip assembly relative to the end section 78 of the rotor blade 41′. FIGURE 19 shows the tip assembly 45′ after it has been used for some time and has been adjusted radially outward, it being observable that wear has caused the disappearance of the flutes or channels 76 and a noticeable broadening of the outer edge of steel tip 73. As best seen in FIGURES 16 and 20, a pair of sealing rings 86 are disposed peripherally about the rotor and diametrically expanded by the compression rings 67 to provide a rotor to stator axial end seal in the manner previously described in connection with the showing of FIGURE 11, the sealing ring assemblies in this case dispensing with the thin rings 64. As best seen in FIGURE 21, the sealing elements 75 are provided at opposite ends with a plurality of wedgelike formations 87 which engage with the inner one of the sealing rings 86 as the compression ring 67 is drawn up by means of the bolts 69 to thereby complete the perimetral seals for each individual pocket of the rotor. As in the case of the previously described arrangement illustrated in FIGURES 3 to 11, the oppositely projecting formations 87 of the sealing elements 75 engage the peripheral sealing rings 86 and thus serve to lock the same against shifting thereof relatively to the rotor.

Having now described my invention in connection with particularly illustrated embodiments thereof, it will be appreciated that variations and modifications of my invention may now occur from time to time to those persons normally skilled in the art without departing from the essential scope or spirit of my invention, and accordingly it is intended to claim the same broadly as well as specifically as indicated by the appended claims.

What is claimed to be new and useful is:

1. A rotary feeder mechanism for conduited bulk material comprising a main housing having a cylindrical passage therethrough, the cylindrical axis of which extends transversely to the flow of material, an inlet throat and a discharge outlet each communicating with the cylindrical passage of the main housing, a rotor disposed within the cylindrical passage and adapted to rotate therein, said rotor including a plurality of pockets spaced peripherally thereabout which rotate successively past the inlet throat and discharge outlet as said rotor rotates, each of said pockets being defined by a pair of angularly-spaced radially-extending rotor blades and a sector of each of the opposite end walls of the rotor, each of said rotor blades having a sealing tip assembly secured to its outer edge and extending transversely the full width of the rotor pocket and extending radially into sealing engagement with the cylindrical passage of the main housing, and each of said sealing tip assemblies including at least one resilient sealing element and a metal tip element in a layered structure arranged with the metal tip element disposed in front of the said at least one resilient element in terms of the rotational sense of the rotor, said metal tip element and at least one resilient sealing element being both in wiping contact with the wall of the cylindrical passage of the main housing and including means for independently adjusting the same radially relative to the rotor blade to which the sealing tip assembly is secured to thereby permit compensation for wear, said resilient sealing element being of U-shape in cross-section to provide a pair of spaced wall parts disposed in straddling relation to the rotor blade and a base part overlying the longitudinal outer edge of the rotor blade for sealing engagement with the cylindrical passage of the main housing.

2. The rotary feeder mechanism as set forth in claim 1 wherein the inner face of the sealing element base is spaced radially outward from the outer edge of the rotor blade tip to define a tip space therebetween, and wherein said tip space is filled with a resilient substance which exerts a biasing force directed radially outward on said sealing element.

3. A rotary feeder mechanism for conduited bulk material comprising a main housing having a cylindrical passage therethrough, the cylindrical axis of which extends transversely to the flow of material, an inlet throat and a discharge outlet each communicating with the cylindrical passage of the main housing, a rotor disposed within the cylindrical passage and adapted to rotate therein, said rotor including a plurality of pockets spaced peripherally thereabout which rotate successively past the inlet throat and discharge outlet as said rotor rotates, each of said pockets being defined by a pair of angularly-spaced radially-extending rotor blades and a sector of each of the opposite end walls of the rotor, each of said rotor blades having a sealing tip assembly secured to its outer edge and extending transversely the full width of the rotor pocket and extending radially into sealing engagement with the cylindrical passage of the main housing, and a pair of sealing ring assemblies including sealing rings disposed upon said rotor circumferentially thereabout at opposite ends thereof axially outward of and respectively in engagement with the opposite ends of said rotor blades carried sealing tip assemblies, said sealing ring assemblies including compression means carried by said rotor effective to axially compress and diametrically expand said sealing rings into sealing engagement with the cylindrical passage of the main housing and to thereby form a peripheral seal about each rotor pocket conjointly with said rotor blades sealing tip assemblies, each of said sealing tip assemblies being arranged in layers including a metal tip element disposed in front of a pair of resilient sealing elements which latter are separated by a spacer element sandwiched between said pair of resilient elements, said metal tip element and resilient sealing elements including means for independently adjusting the same radially relative to the rotor blade tip to which the sealing tip assembly is secured to thereby permit positional compensation for wear.

4. A rotary feeder mechanism for conduited bulk material comprising a main housing having a cylindrical passage therethrough, the cylindrical axis of which extends transversely to the flow of material, an inlet throat and a discharge outlet each communicating with the cylindrical passage of the main housing, a rotor disposed within the cylindrical passage and adapted to rotate therein, said rotor including a plurality of pockets spaced peripherally thereabout which rotate successively past the inlet throat and discharge outlet as said rotor rotates, each of said pockets being defined by a pair of angularly-spaced radially-extending rotor blades and a sector of each of the opposite end walls of the rotor, each of said rotor blades having a sealing tip assembly secured to its outer edge and extending transversely the full width of the rotor pocket and extending radially into sealing engagement with the cylindrical passage of the main housing, and a pair of sealing ring assemblies including sealing rings disposed upon said rotor circumferentially thereabout at opposite ends thereof axially outward of and respectively in engagement with the opposite ends of said rotor blades carried sealing tip assemblies, said sealing ring assemblies including compression means carried by said rotor effective to axially compress and diametrically expand said sealing rings into sealing engagement with the cylindrical passage of the main housing and to thereby form a peripheral seal about each rotor pocket conjointly with said rotor blades sealing tip assemblies, said sealing ring assemblies compression means carried by said rotor including a shoulder extending completely peripherally about each end of said rotor axially inward from the ends of the rotor and a coaxial compression ring secured to each end of said rotor by adjustable means for axially positioning said compression ring relative to the rotor, said circumferentially extending sealing rings being axially disposed between a said shoulder and a said compression ring for axial compression therebetween as said compression ring is moved axially inward of said rotor toward said shoulder.

5. A rotary feeder mechanism for conduited bulk material comprising a main housing having a cylindrical passage therethrough, the cylindrical axis of which extends transversely to the flow of material, an inlet throat and a discharge outlet each communicating with the cylindrical passage of the main housing, a rotor disposed within the cylindrical passage and adapted to rotate therein, said rotor including a plurality of pockets spaced peripherally thereabout which rotate successively past the inlet throat and discharge outlet as said rotor rotates, each of said pockets being defined by a pair of angularly-spaced radially-extending rotor blades and a sector of each of the opposite end walls of the rotor, a pair of end members respectively close fittingly closing the opposite ends of said main housing cylindrical passage at axially spaced opposite ends of said rotor to define an end space between each end member and the proximate rotor end wall, and removable closure means associated with each said end member for communicating with each of said end spaces, each of said rotor blades having a sealing tip assembly secured to its outer edge and extending transversely the full width of the rotor pocket and extending radially into sealing engagement with the cylindrical passage of the main housing, and a pair of sealing ring assemblies including sealing rings disposed upon said rotor circumferentially thereabout at opposite ends thereof axially outward of and respectively in engagement with the opposite ends of said rotor blades carried sealing tip assemblies, said sealing ring assemblies including compression means carried by said rotor effective to axially compress and diametrically expand said sealing rings into sealing engagement with the cylindrical passage of the main housing and to thereby form a peripheral seal about each rotor pocket conjointly with said rotor blades sealing tip assemblies, said sealing ring assemblies compression means carried by said rotor including a shoulder extending completely peripherally about each end of said rotor axially inward from the ends of the rotor and a coaxial compression ring secured to each end of said rotor by adjustable means for axially positioning said compression ring relative to the rotor, said circumferentially extending sealing rings being axially disposed between a said shoulder and a said compression ring for axial compression therebetween as said compression ring is moved axially inward of said rotor toward said shoulder.

6. The rotary feeder mechanism as set forth in claim 5 wherein said removable closure means associated with each said end member for communicating with said end spaces are so positioned that said adjustable means for axially positioning said compression rings relative to said rotor are accessible for adjustment through said end members when said removable closure means are removed.

7. A rotary feeder mechanism for conduited bulk material comprising a main housing having a cylindrical passage therethrough, the cylindrical axis of which extends transversely to the flow of material, an inlet throat and a discharge outlet each communicating with the cylindrical passage of the main housing, a rotor disposed within the cylindrical passage and adapted to rotate therein, said rotor including a plurality of pockets spaced peripherally thereabout which rotate successively past the inlet throat and discharge outlet as said rotor rotates, each of said pockets being defined by a pair of angularly-spaced radially-extending rotor blades and a sector of each of the opposite end walls of the rotor, each of said rotor blades having a sealing tip assembly secured to its outer edge and extending transversely the full width of the rotor pocket and extending radially into sealing engagement with the cylindrical passage of the main housing, and a pair of sealing ring assemblies including sealing rings disposed upon said rotor circumferentially thereabout at opposite ends thereof axially outward of and respectively in engagement with the opposite ends of said rotor blades carried sealing tip assemblies, said sealing ring assemblies including compression means carried by said rotor effective to axially compress and diametrically expand said sealing rings into sealing engagement with the cylindrical passage of the main housing and to thereby form a peripheral seal about each rotor pocket conjointly with said rotor blades sealing tip assemblies, each of said sealing tip assemblies including at least one resilient sealing element and a metal tip element in a layered structure arranged with the metal tip element disposed in front of said at least one resilient element in terms of the rotational sense of the rotor, said metal tip element and at least one resilient sealing element including means for independently adjusting the same radially relative to the rotor blade to which the sealing tip assembly is secured to thereby permit compensation for wear, said sealing ring assemblies compression means carried by said rotor including a shoulder extending completely peripherally about each end of said rotor axially inward from the ends of the rotor and a coaxial compression ring secured to each end of said rotor by adjustable means for axially positioning said compression ring relative to the rotor, said circumferentially extending sealing rings being axially disposed between a said shoulder and a said compression ring for axial compression therebetween as said compression ring is moved axially inward of said rotor toward said shoulder.

8. A rotary feeder mechanism for conduited bulk material comprising a main housing having a cylindrical passage therethrough, the cylindrical axis of which extends transversely to the flow of material, an inlet throat and a discharge outlet each communicating with the cylindrical passage of the main housing, a rotor disposed within the cylindrical passage and adapted to rotate therein, said rotor including a plurality of open-ended pockets spaced peripherally thereabout which rotate successively past the inlet throat and discharge outlet as said rotor rotates, each of said pockets being defined by a pair of angularly-spaced radially-extending rotor blades and a sector of each of the opposite end walls of the rotor whereby the open end of each pocket is provided with a perimetrally continuous marginal edge, said marginal edge of each pocket being provided with a seal extending continuously about the full perimeter of the open end thereof for wiping contact with the wall of the cylindrical passage of the main housing to isolate each such pocket from the pockets adjacent thereto within the regions of said housing extending between said inlet throat and discharge outlet, said pocket peripheral seals being secured to and rotatable with said rotor.

9. A rotary feeder mechanism as defined in claim 8 characterised by the provision of a pair of end members respectively close fittingly closing the opposite ends of said main housing cylindrical passage at axially spaced opposite ends of said rotor to define an end space between each end member and the proximate rotor end wall, and removable closure means associated with each said end member for communicating with each of said end spaces.

10. A rotary feeder mechanism for conduited bulk material comprising a main housing having a cylindrical passage therethrough, the cylindrical axis of which extends transversely to the flow of material, an inlet throat and a discharge outlet each communicating with the cylindrical passage of the main housing, a rotor disposed within the cylindrical passage and adapted to rotate therein, said rotor being provided at each opposite end thereof with a shouldered cylindrical extension and including a plurality of pockets spaced peripehrally thereabout which rotate successively past the inlet throat and discharge outlet as said rotor rotates, each of said pockets being defined by a pair of end walls and a pair of angularly-spaced radially-extending rotor blades having their free edges projecting a substantial distance radially beyond said shouldered cylindrical extensions for wiping contact with the wall of the cylindrical passage of the main housing, and a pair of sealing ring assemblies including sealing rings disposed upon said shouldered cylindrical extensions of said rotor and extending circumferentially thereabout in close juxtaposition respectively to the opposite ends of said rotor blades, said sealing ring assemblies including compression means also carried by said rotor effective to axially compress said sealing rings upon said shouldered cylindrical extensions of the rotor and to diametrically expand said sealing rings into sealing engagement with the cylindrical passage of the main housing to thereby form a peripheral seal about each opposite end of the rotor in close association with the corresponding ends of the rotor blades.

11. A rotary feeder mechanism for conduited bulk material comprising a main housing having a cylindrical passage therethrough, the cylindrical axis of which extends transversely to the flow of material, an inlet throat and a discharge outlet each communicating with the cylindrical passage of the main housing, a rotor disposed within the cylindrical passage and adapted to rotate therein, said rotor including a plurality of pockets spaced peripherally thereabout which rotate successively past the inlet throat and discharge outlet as said rotor rotates, each of said pockets being defined by a pair of angularly-spaced radially extending rotor blades and a sector of each of the opposite end walls of the rotor, each pocket being provided with a seal extending about the full perimeter of the outer marginal edge thereof and adapted to contact the wall of the cylindrical passage of the main housing whereby to fully isolate each such pocket from the pockets adjacent thereto, said pocket perimetral seals being secured to and rotatable with said rotor, each of said rotor blades having a bladelike tip element secured to and extending radially outward from its outer edge in advance of the blade portion of said seal for engagement with the cylindrical surface of the main housing passage, and shear means within said inlet throat co-operating with the bladelike tip elements for shearing off conduited material disposed partly within the inlet throat and partly within a rotor pocket, said shear means being contoured to conform to the cylindrical surface of the passage in the main housing and act as an extension thereof partially into the inlet throat, and said inlet throat being of expanded cross-sectional area in a plane perpendicular to the direction of material flow in the region of the shear means so that the effective throat cross-sectional area is not reduced by the presence of said shear means.

12. A rotary feeder mechanism for conduited bulk material comprising a main housing having a cylindrical passage therethrough, the cylindrical axis of which extends transversely to the flow of material, an inlet throat and a discharge outlet each communicating with the cylindrical passage of the main housing, a rotor disposed within the cylindrical passage and adapted to rotate therein, said rotor being externally provided at each opposite end thereof with a shouldered cylindrical portion and internally thereof with a plurality of pockets spaced peripherally thereabout which rotate successively past the inlet throat and discharge outlet as said rotor rotates, each of said internal pockets being defined by a pair of angularly-spaced radially-extending rotor blades and a sector of each of the opposite end walls of the rotor whereby the open end of each pocket is provided with a perimetrally continuous marginal edge, each of said rotor blades having a sealing tip assembly secured to its outer edge and extending transversely across substantially the full width of the rotor pocket and radially into sealing engagement with the cylindrical passage of the main housing, peripheral sealing means carried by and extending circumferentially about each opposite end wall of the rotor for rotation therewith, said peripheral sealing means being respectively seated upon said shouldered portions of the rotor for expansion radially into constant sealing engagement with the cylindrical passage of the main housing during rotation of the rotor, and clamping means carried by said rotor externally of said peripheral sealing means to effectively engage and compress the same against said shouldered seat portions of the rotor.

13. A rotary feeder as defined in claim 12 wherein said rotor includes means which project into said shouldered cylindrical portions of the rotor for engagement with said peripheral sealing means to serve conjointly with said clamping means to effectively anchor said sealing means against shifting movement thereof relatively to the rotor.

14. A rotary feeder as defined in claim 12 wherein said shouldered cylindrical portions of the rotor are provided with circumferentially spaced notched-out portions for exposing correspondingly spaced internal portions of said peripheral sealing means and wherein said rotor is provided with means projecting through said notched-out portions for engaging said exposed internal portions of said sealing means to anchor the same against rotation upon said shouldered portions.

References Cited by the Examiner

UNITED STATES PATENTS

| | | | |
|---|---|---|---|
| 659,086 | 10/00 | Moussette | 222—368 X |
| 1,143,634 | 6/15 | Line et al. | 222—345 X |
| 2,858,212 | 10/58 | Durant et al. | 222—368 X |
| 3,052,383 | 9/62 | Transeau | 222—345 |
| 3,077,272 | 2/63 | Reinhall | 222—368 X |

LOUIS J. DEMBO, *Primary Examiner.*